United States Patent
Yan

(10) Patent No.: US 10,491,594 B2
(45) Date of Patent: Nov. 26, 2019

(54) SECURITY AND TRUST FRAMEWORK FOR VIRTUALIZED NETWORKS

(71) Applicant: Nokia Technologies Oy, Espoo (FI)

(72) Inventor: Zheng Yan, Xian (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 209 days.

(21) Appl. No.: 15/326,146

(22) PCT Filed: Aug. 22, 2014

(86) PCT No.: PCT/CN2014/084971
§ 371 (c)(1),
(2) Date: Jan. 13, 2017

(87) PCT Pub. No.: WO2016/026129
PCT Pub. Date: Feb. 25, 2016

(65) Prior Publication Data
US 2017/0214694 A1   Jul. 27, 2017

(51) Int. Cl.
*G06F 21/57* (2013.01)
*H04L 29/06* (2006.01)
(Continued)

(52) U.S. Cl.
CPC ........ *H04L 63/101* (2013.01); *G06F 9/45558* (2013.01); *G06F 21/53* (2013.01);
(Continued)

(58) Field of Classification Search
CPC .. H04L 63/101; H04L 63/0876; H04W 12/10; G06F 9/455; G06F 21/57
See application file for complete search history.

(56) References Cited

U.S. PATENT DOCUMENTS

| 8,671,438 B2 | 3/2014 | Parker et al. |
| 2005/0132229 A1 | 6/2005 | Zhang et al. |

(Continued)

FOREIGN PATENT DOCUMENTS

| CN | 101232424 A | 7/2008 |
| CN | 102930213 A | 2/2013 |

(Continued)

OTHER PUBLICATIONS

Fayazbakhsh et al. Verifiable network function outsourcing: requirements, challenges, and roadmapDec. 9, 2013HotMiddlebox '13 Proceedings of the 2013 workshop on Hot topics in middleboxes and network function virtualizationpp. 25-30 (Year: 2013).*

(Continued)

*Primary Examiner* — David J Pearson
(74) *Attorney, Agent, or Firm* — Squire Patton Boggs (US) LLP

(57) ABSTRACT

A framework, apparatus, system and method for realizing security and trust management for virtualized networks. A computing platform for implementation in a networking device of a virtualized network comprises a root-trusted module layer, which includes a root trust module for providing root trust; and a middleware layer, which includes system-level components configured to manage security and trust of virtualized network functions by verifying, establishing or maintaining trust with regard to the virtualized network functions based on the root trust. The computing platform can further comprise a number of virtualized security and trust functions that can be flexibly deployed in the virtualized network function infrastructure supported by the above two layers.

18 Claims, 8 Drawing Sheets

(51) Int. Cl.
    H04L 9/32      (2006.01)
    G06F 9/455     (2018.01)
    H04L 12/24     (2006.01)
    G06F 21/53     (2013.01)
    H04L 29/08     (2006.01)
(52) U.S. Cl.
    CPC ............ *G06F 21/57* (2013.01); *H04L 9/3239*
            (2013.01); *H04L 41/14* (2013.01); *H04L*
            *41/5009* (2013.01); *H04L 63/02* (2013.01);
            *H04L 63/0428* (2013.01); *H04L 63/0853*
            (2013.01); *H04L 63/1441* (2013.01); *H04L*
            *63/16* (2013.01); *H04L 63/20* (2013.01); *G06F*
            *21/575* (2013.01); *G06F 2009/45595*
            (2013.01); *G06F 2221/034* (2013.01); *H04L*
            *67/10* (2013.01); *H04L 2463/101* (2013.01)

(56)                References Cited

U.S. PATENT DOCUMENTS

| | | | |
|---|---|---|---|
| 2009/0150682 A1* | 6/2009 | Ferris | G06F 21/6272 713/193 |
| 2009/0307705 A1 | 12/2009 | Bogner | |
| 2011/0265158 A1* | 10/2011 | Cha | G06F 21/57 726/6 |
| 2012/0054847 A1 | 3/2012 | Shultz et al. | |
| 2012/0278869 A1* | 11/2012 | Guccione | H04L 63/102 726/5 |
| 2014/0181677 A1* | 6/2014 | Brandwine | H04L 41/22 715/736 |
| 2014/0317293 A1* | 10/2014 | Shatzkamer | G06F 9/455 709/226 |
| 2014/0369209 A1* | 12/2014 | Khurshid | H04L 41/0866 370/250 |
| 2017/0054565 A1* | 2/2017 | Feng | H04L 9/32 |

FOREIGN PATENT DOCUMENTS

| | | |
|---|---|---|
| CN | 103841198 A | 6/2014 |
| WO | 2013/184225 A1 | 12/2013 |

OTHER PUBLICATIONS

International Search Report and Written Opinion received for corresponding Patent Cooperation Treaty Application No. PCT/CN2014/084971, dated May 27, 2015, 14 pages.
Shen et al., "Hierarchal Security Architecture of Virtualized Trusted Platform", Journal of Beijing University of Technology, May 31, 2010, pp. 605-610.
Kloti et al., "OpenFlow: A Security Analysis", IEEE International Conference on Network Protocols (ICNP), Oct. 7-10, 2013, 6 pages.
Sezer et al., "Are we ready for SDN? Implementation Challenges for Software-defined Networks", IEEE Communications Magazine, vol. 51, No. 7, Jul. 2013, pp. 36-43.
Santos et al., "Software-Defined Networking Based Capacity Sharing in Hybrid Networks", IEEE International Conference on Network Protocols (ICNP), Oct. 7-10, 2013, pp. 1-6.
Yu et al., "Authentication for Resilience: The Case of SDN", Security Protocols XXI Lecture Notes in Computer Science, vol. 8263, 2013, pp. 39-44.
Jin et al., "Malware Detection for Mobile Devices Using Software-Defined Networking", Proceedings of the 2013 Second GENI Research and Educational Experiment Workshop, 2013, pp. 81-88.
Dotcenko et al., "A Fuzzy Logic-Based Information Security Management for Software-Defined Networks", 16th International Conference on Advanced Communication Technology, Feb. 16-19, 2014, pp. 167-171.
Hayward et al., "Sdn Security: A Survey", IEEE SDN for Future Networks and Services (SDN4FNS), Nov. 11-13, 2013, pp. 1-7.

Yan et al., "A Generic Solution for Unwanted Traffic Control through Trust Management", New Review in Hypermedia and Multimedia, vol. 20, No. 1, 2014, pp. 25-51.
"Network Functions Virtualisation", SDN and OpenFlow World Congress, Oct. 22-24, 2012, pp. 1-16.
"Network Functions Virtualisation (NFV); Use Cases", ETSI GS NFV 001, V1.1.1, Oct. 2013, pp. 1-50.
"Network Functions Virtualisation (NFV); ArchitecturalFramework", ETSI GS NFV 002, V1.1.1, Oct. 2013, pp. 1-21.
"Network Functions Virtualisation (NFV); VirtualisationRequirements", ETSI GS NFV 004, V1.1.1, Oct. 2013, pp. 1-17.
Cheung et al., "Guest Editorial: Special Issue on Privacy and Trust Management in Cloud and Distributed Systems", IEEE Transactions on Information Forensics and Security, vol. 8, No. 6, Jun. 2013, pp. 835-837.
Juan et al., "HASBE: A Hierarchical Attribute-Based Solution for Flexible and Scalable Access Control in Cloud Computing", IEEE Transactions on Information Forensics and Security, vol. 7, No. 2, Apr. 2012, pp. 743-754.
Yu et al., "Achieving Secure, Scalable, and Fine Grained Data Access Control in Cloud Computing", Proceedings IEEE Infocom, Mar. 14-19, 2010, 9 pages.
Sanchez et al., "Enhancing Privacy and Dynamic Federation in Idm for Consumer Cloud Computing", IEEE Transactions on Consumer Electronics, vol. 58, No. 1, Feb. 2012, pp. 95-103.
Spring, "Monitoring Cloud Computing by Layer, Part 1", IEEE Security & Privacy, vol. 9, No. 2, Mar.-Apr. 2011, pp. 36-68.
Zhang et al., "Building Up Trusted Identity Management in Mobile Heterogeneous Environment", IEEE 10th International Conference on Trust, Security and Privacy in Computing and Communications, Nov. 16-18, 2011, pp. 873-877.
Wang et al., "Enabling Secure and Efficient Ranked Keyword Search over Outsourced Cloud Data", IEEE Transactions on Parallel and Distributed Systems, vol. 23, No. 8, Aug. 2012, pp. 1467-1479.
Wang et al., "Privacy-Preserving Public Auditing for Data Storage Security in Cloud Computing", Proceedings IEEE Infocom, Mar. 14-19, 2010, pp. 1-9.
Khan et al., "Establishing Trust in Cloud Computing", IT Professional, vol. 12, No. 5, Sep.-Oct. 2010, pp. 20-27.
Lynch, "Inside the Identity Management Game", IEEE Internet Computing, vol. 15, No. 5, Sep.-Oct. 2011, pp. 78-82.
Hwang et al., "Trusted Cloud Computing With Secure Resources and Data Coloring", IEEE Internet Computing, vol. 14, No. 5, Sep.-Oct. 2010, pp. 14-22.
Yan et al., "A Mechanism for Trust Sustainability among Trusted Computing Platforms", International Conference on Trust, Privacy and Security in Digital Business, vol. 3184, 2004, 10 pages.
Yan et al., "Autonomic Trust Management for a Component Based Software System", IEEE Transactions on Dependable and Secure Computing, vol. 8, No. 6, Nov.-Dec. 2011, pp. 810-823.
Leung et al., "Unveiling 5G Wireless Networks: Emerging Research Advances, Prospects, and Challenges", IEEE Network, Nov.-Dec. 2014, pp. 1-5.
"Openflow-enabled SDN and Network Functions Virtualization", Open Networking Foundation, Feb. 17, 2014, pp. 1-12.
Extended European Search Report received for corresponding European Patent Application No. 14900219.8, dated Feb. 7, 2018, 8 pages.
"Network Functions Virtualisation (NFV) NFV Security Problem Statement", Draft ETSI GS NFV-SEC 001, V0.0.7, Nov. 2013, pp. 1-39.
"Network Functions Virtualization (NFV) Management and Orchestration", ETSI GS NFV-MAN 001, V0.6.1, Jul. 2014, pp. 1-196.
Office action received for corresponding Chinese Patent Application No. 201480081342.9, dated Oct. 15, 2018, 7 pages of office action and no pages of office action translation available.
European Office Action corresponding to Appln. No. 14 900 219.8, dated Jan. 22, 2019.
Steve Garrison et al., "Understanding the differences between Software Defined Networking, network virtualization and Network Functions Virtualization", Network World, Feb. 11, 2014, XP055542133, 6 pages.

(56) References Cited

OTHER PUBLICATIONS

Chinese Office Action corresponding to Appln. No. 201480081342.9, dated Mar. 1, 2019.
Communication pursuant to Article 94(3) EPC issued in corresponding European Patent Application No. 14900219.8, dated Jun. 12, 2019.
Third Office Action issued in corresponding Chinese Patent Application No. 201480081342.9, dated Jun. 10, 2019.

* cited by examiner

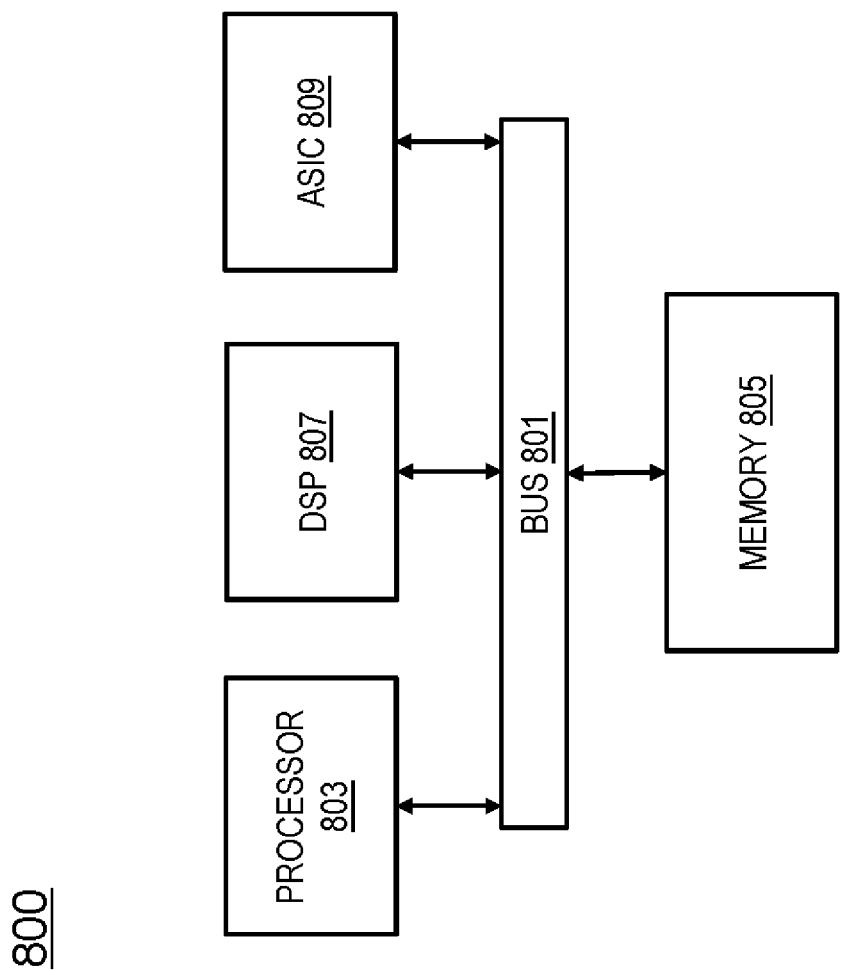

SECURITY AND TRUST FRAMEWORK FOR VIRTUALIZED NETWORKS

RELATED APPLICATION

This application was originally filed as Patent Cooperation Treaty Application No. PCT/CN2014/084971 filed Aug. 22, 2014.

FIELD OF THE INVENTION

The present invention generally relates to security of communication networks and applications, and more specifically, to a security and trust framework for virtualized networks.

BACKGROUND

With a fast development of communication networks, many new technologies, including massive dense networks, interference and mobility management, Internet of Things (IoT), Software-Defined Networking (SDN), Network Functions Virtualization (NFV), pervasive and social computing, mobile ad hoc networks (MANET), cognitive radio, cloud computing and so on, are proposed to offer a big data bandwidth and infinite capability of networking for the next generation networks. For example, with the NFV technology, network functions will be highly virtualized, so that network hardware and software can be separated at most of devices (such as servers, switches, routers and base stations) over the whole networks, in order to enhance the flexibility of network function provision and update, as well as reduce the cost of network deployment. Such networks in which at least part of network functions are virtualized with the NFV technology, are referred to as virtualized networks.

However, integrating all above and innovating new techniques for communication networks would introduce extreme challenges on network security and trust for virtualized networks. A number of issues such as network security and trust architecture, trustworthy transmission collaboration, secure network service provision, seamless and secure integration of all available networking resources, etc. have not been seriously explored and studied.

Thus, it would be advancement in the art to provide an approach to realize security and trust managements for the next generation communication networks, especially virtualized networks.

SOME EXAMPLE EMBODIMENTS

To overcome the problem described above, and to overcome the limitations that will be apparent upon reading and understanding the prior arts, the disclosure provides a framework, apparatus, system and method for realizing security and trust management for virtualized networks.

According to one embodiment, a computing platform for implementation in a networking device of a virtualized network comprises a root-trusted module layer, which includes a root trust module for providing root trust; and a middleware layer, which includes system-level components configured to manage security and trust of virtualized network functions by verifying or establishing trust with regard to the virtualized network functions based on the root trust. The virtualized network functions may include virtualized network functions related or not related to security and trust.

In an exemplary embodiment, the system-level components of the middleware layer can comprise a reputation management component configured to monitor performance of the virtualized network functions; evaluate reputations of the virtualized network functions based on the performance and other collected related information; and select virtualized network functions based on respective evaluated reputations.

In an exemplary embodiment, the system-level components of the middleware layer can comprise a trust enhancement component configured to: monitor QoS-related performance of a virtualized network function; evaluate trust of the virtualized network function based on the monitored performance; and adaptively select an arrangement strategy and control modes based on the evaluated trust.

In an exemplary embodiment, the system-level components of the middleware layer can comprise a trust insurance component configured to: embed policies for executions of the virtualized network functions into a secure storage; verify trust throughout executions of the virtualized network functions based on a fulfillment of the embedded policies; and ensure the embedded policies to be fulfilled. The policies can be defined by a third party, and the trust insurance component can be further configured to cause an authentication for the third party before the policies is allowed to be embedded. The policies can comprise virtualized network function forwarding graphs.

In an exemplary embodiment, the virtualized network functions can be identified by using associated hash codes that are registered in the root trust module.

In an exemplary embodiment, the middleware layer can be embedded into a virtualization layer according to a standard network function virtualization infrastructure. The computing platform can be deployed in the networking device as a service.

In an exemplary embodiment, the computing platform can further comprise a virtualized network function layer, including the virtualized network functions related to security and trust. The virtualized network functions can be deployed in the networking device as a service.

According to another embodiment, an apparatus for security and trust in a virtualized network comprising at least one processor, and at least one memory including computer program code, the at least one memory and the computer program code configured to, with the at least one processor, cause, at least in part, the apparatus to deploy a root trust module for providing root trust; and deploy a middleware, for managing security and trust of virtualized network functions by verifying or establishing trust with regard to the virtualized network functions based on the root trust. The virtualized network functions may include virtualized network functions related or not related to security and trust.

According to another embodiment, a method for security and trust management in a virtualized network comprises: deploying a root trust module for providing root trust; and deploying a middleware, for managing security and trust of virtualized network functions by verifying, establishing or maintaining trust with regard to the virtualized network functions based on the root trust.

The method further can comprise managing security and trust of virtualized network functions by the middleware. In an exemplary embodiment, the managing can comprise: monitoring performance of the virtualized network functions; evaluating reputations of the virtualized network functions based on the performance and other collected related information; and selecting trustworthy virtualized network functions based on respective evaluated reputations.

In an exemplary embodiment, the managing can comprise monitoring QoS-related performance of a virtualized network function; evaluating trust of the virtualized network function based on the monitored performance; adaptively selecting a resource arrangement strategy and control modes based on the evaluated trust.

In an exemplary embodiment, the managing can comprise embedding policies for executions of the virtualized network functions into a secure storage; verifying trust throughout executions of the virtualized network functions based on a fulfillment of the embedded policies; and ensuring the embedded policies to be fulfilled. The policies are defined by a third party, and the managing can further comprise causing an authentication for the third party before the policies is allowed to be embedded.

In an exemplary embodiment, the method can further comprise deploying virtualized network functions related to security and trust.

According to another embodiment, a computer-readable storage medium carrying one or more sequences of one or more instructions which, when executed by one or more processors, cause, at least in part, an apparatus to perform one of the methods discussed above.

According to another embodiment, an apparatus comprises means for performing one of the methods discussed above.

A computer program product including one or more sequences of one or more instructions, which, when executed by one or more processors, cause an apparatus to at least perform one of the methods discussed above.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of a chip set that can be used to implement an embodiment of the invention.

DETAILED DESCRIPTION OF THE INVENTION

Figure 1:
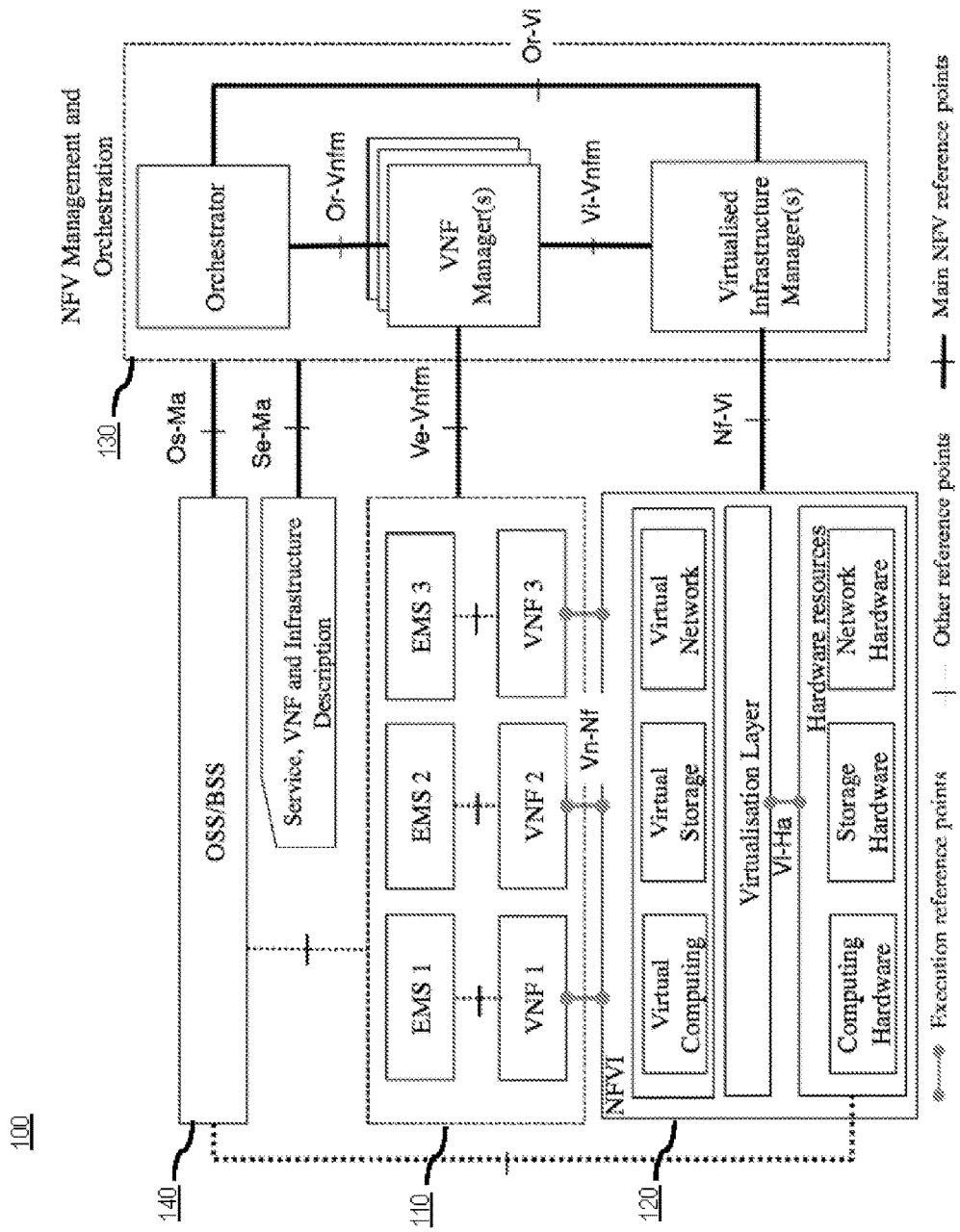
FIG. 1 illustrates a NFV reference architectural framework in which an exemplary framework of security and trust for virtualized networks may be embedded according to an embodiment.

Examples of a framework, apparatus, system and method for realizing security and trust management for virtualized networks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The concepts of NFV, SDN and cloud computing technologies have been widely accepted and adopted in industry in recent years. Network Functions Virtualization aims to transform the way that network operators architect networks by evolving standard IT virtualization technology to consolidate many network equipment types onto industry standard high volume servers, switches and storage, which could be located in datacenters, network nodes and in the end user premises. It involves the implementation of network functions in software that can run on a range of industry standard server hardware, and that can be moved to, or instantiated in, various locations in the network as required, without the need for installation of new equipment.

The European Telecommunications Standards Institute (ETSI) has published some documents, in which an introduction, benefits, enablers and challenges of NFV are specified for initiating actions with regard to applying NFV in the next generation communication networks. In virtualized networks, network functions can be provided as a service for the purpose of networking, for example in a similar way as cloud computing services. A number of use cases are specified with regard to NFV, such as Network Functions Virtualization Infrastructure as a Service, Virtual Network Function as a Service (VNFaaS), Virtual Network Platform as a Service (VNPaaS), VNF Forwarding Graphs, Virtualization of Mobile Core Network and IMS, Virtualization of Mobile base station, Virtualization of the Home Environment, Virtualization of CDNs (vCDN), and Fixed Access Network Functions Virtualization.

As such, in virtualized networks, NFVI may become the basic network function deployment platform, which can be applied by a networking device. Meanwhile, SDN may be applied for network traffic flow control (e.g., routing & switching), and network functions may be provisioned based on cloud computing technologies and deployed with NFVI. As such, virtualized network functions can be accessed like what we use IT services, as benefited from cloud computing technologies.

SDN is an approach to design, build and manage networks. The basic concept is that SDN separates the network's control (like brains) planes and data-forwarding (like muscles) planes to make it easier to optimize each. In this environment, a controller is deployed to act as the "brains,"

providing an abstract, centralized view of the overall network. Through the controller, network administrators can quickly and easily make and push out decisions on how the underlying systems (such as switches, routers) of the data-forwarding plane (in short data plane) will handle the traffic. A protocol OpenFlow is proposed to be used in SDN networks, to facilitate the communication between the controller (commonly called the Southbound API) and the switches. An SDN environment can also use open, application programmatic interfaces (APIs) to support all the services and applications running over the network. These APIs, commonly called Northbound APIs, facilitate innovation and enable efficient service orchestration and automation. As a result, SDN enables a network administrator to shape traffic and deploy services to address changing business needs, without having to touch each individual switch or router in the data-forwarding plane. Applying SDN has many benefits, such as reducing cost of new network function deployment, making it easier to design, deploy, manage and scale networks, improving deliver agility and flexibility, and enabling innovation.

Based on SDN, data planes and control planes are separated, in order to make the data traffic forwarded from a source to a destination based on instructions generated by the control plane by applying whatever smart routing and traffic controlling technologies. This evolution makes possible to intelligently and flexibly control traffic flows by applying recent technical advances, such as IoT data mining, traffic monitoring and analysis, as well as intrusion detection, etc. so as to achieve the best network throughput.

Cloud computing technology delivers computing resources as a service over a network (e.g., the Internet). It offers a new way of Information Technology (IT) services by re-arranging various resources (e.g., storage, computing and services) and providing them to users based on their demand. Cloud computing provides a big resource pool by linking network resources together. It has desirable properties, such as scalability, elasticity, fault-tolerance, and pay-per-use. Thus, it becomes a promising service platform, rearranging the structure of IT, the future network infrastructure and its deployment.

However, security and trust become a crucial issue in practical deployment of the above technologies in the virtualized networks. The critical problem is that, there is no practical security and trust architecture that can support virtualized networks. In this regard, several issues may be concerned for security and trust of virtualized networks. For example, a first issue may be that, the network function virtualization infrastructure (NFVI) (comprising hardware and middleware) should be secured and trustworthy to deploy and allocate various network functions, for example in the form of software. A second issue may be trust management problems in NFVI, such as how to ensure the QoS of various virtualized network functions running on NFVI, how to select the trust worthiest functions to allocate in NFVI in a specific context. A third issue may be how to ensure SDN security and NFVI security, e.g., fight against intrusions and countermeasure malicious attacks and vulnerabilities. A forth issue may be how to flexibly provide sufficient security services or functions in the next generation communication networks in an economic way. A fifth may be how to provide various security functions based on NFVI in a trustworthy way, supposed that many options offered by different vendors can be selected. A sixth issue may be how to make a set of virtualized network functions (VNFs) to cooperate and work together as the expectation of an authorized party. Herein, only a limited number of security and trust issues related to the virtualized networks are listed. In fact, there may be more issues when security and trust of the virtualized networks are further investigated and when a standard infrastructure of the next generation networks is available under a specific security and trust model.

Although ETSI specifies NFV reference architectural framework and requirements, including security, it lacks a uniform and generic security and trust framework to support the above security requirements over virtualized networks. It is hard for the current SDN and cloud computing technologies to support the above security requirements over virtualized networks.

Further, it is impossible to use existed SDN security mechanism for security and trust management for virtualized networks. Researches on SDN security may be divided into two aspects: 1) exploit the SDN framework for enhanced network security; 2) the study for ensuring the security of SDN itself. In the first aspect, the SDN technology is applied to implement or deploy security solutions to achieve more secure networking, e.g. applying SDN to perform intrusion/malware detection and unwanted traffic control. In the second aspect, it is estimated that applying SDN could expose the network to a range of new attacks and vulnerabilities, such as intrusions on SDN controller (i.e. on a control plane), trustworthy authentication between a control plane and a data plane, malicious control on routers/switches due to the misbehaviors of controller caused by attacks. Without a significant focus on security, it will not be possible for SDN to support the evolving capability associated with, for example, Network Functions Virtualization (NFV). There are many untapped potential and unresolved challenges. A concerted effort in both directions could yield a truly secure and reliable Software-Defined Network.

Further, it is impossible to use existed security mechanism of clouding computing for security and trust management for virtualized networks. Many technologies have been proposed to enhance trustworthiness for cloud computing. The technologies applied for ensuring a trustworthy cloud computing include data access control for secure data storage at computing service provider (CSP), identity management, privacy enhancement, and trust establishment. Most of existing solutions can also be applied into some scenarios of mobile cloud computing when user data are stored at a third party, especially when making use of mobile Internet architecture. Existing security solutions for cloud computing are enablers to ensure cloud computing quality and trust. Without any doubt, cloud computing will play an important role in the next generation networks for service delivery. In particular, it provides a sound infrastructure for the usage of Security as a Service (SaaS) in order to enhance network security. However, the existing solutions, such as SaaS, cannot solve the problems specified above in the context of the next generation networks applying NFV.

According to various exemplary embodiments, a framework, solution, and approach of security and trust for virtualized networks are provided. Network functions of the virtualized networks are highly virtualized by applying NFV technologies. Network hardware and software are separated at most of network devices (such as server, switches, routers and base stations) over the whole networks. SDN may be applied to control traffic flows in the virtualized networks.

FIG. 1 illustrates a NFV reference architectural framework in which an exemplary framework of security and trust for virtualized networks may be embedded according to an embodiment. As shown in FIG. 1, the architectural framework comprises three main working domains, namely Virtualized Network Function (VFN) domain 110, NFV infrastructure (NFVI) domain 120, NFV Management and Orchestration 130. In some embodiments, the architectural framework may further comprise an OSS (Operation Support System)/BSS (Business Support System) of an operator of virtualized networks.

The VNF domain 110 comprises one or more virtualized network functions (VNFs), each of which is a virtualization of a network function in a legacy non-virtualized network. A VNF can be composed of multiple internal components. For example, one VNF can be deployed over multiple Virtual Machines (VMs), where each VM hosts a single component of the VNF. However, in other cases, the whole VNF can be deployed in a single VM as well. A VNF may be implemented as a software implementation (such as a software-only entity) of a network function, which is capable of running over the NFVI. In the VNF domain 110, the Element Management System (EMS) may be deployed to perform typical management functionalities for one or several VNFs.

The NFVI 120 is the totality of all hardware and software components that build up the environment in which VNFs are deployed, managed and executed. The NFVI can span across several locations, i.e. places where NFV Infrastructure-Point of Presence are operated. The network providing connectivity between these locations is regarded to be part of the NFVI 120. From the VNF's perspective, the virtualization layer and the hardware resources look like a single entity providing them with desired virtualized resources. NFVI supports the execution of the VNFs with the diversity of physical resources which are virtualized.

In the NFVI domain 120, the physical hardware resources include computing, storage and network that provide processing, storage and connectivity to VNFs through the virtualization layer (e.g. hypervisor). Computing hardware is assumed to be COTS (Commercial-Off-The-Shelf) as opposed to purpose-built hardware. Storage resources can be differentiated between shared network attached storage (NAS) and storage that resides on the server itself. Computing and storage resources are commonly pooled. Network resources are comprised of switching functions, e.g. routers, and wired or wireless links. Also, network resources can span different domains.

The virtualization layer abstracts the hardware resources and decouples the VNF software from the underlying hardware, thus ensuring a hardware independent lifecycle for the VNFs. In short, the virtualization layer is responsible for: Abstracting and logically partitioning physical resources, commonly as a hardware abstraction layer; enabling the software that implements the VNF to use the underlying virtualized infrastructure; providing virtualized resources to the VNF, so that the latter can be executed. The virtualization layer in the middle ensures VNFs are decoupled from hardware resources and therefore, the software can be deployed on different physical hardware resources. Typically, this type of functionality is provided for computing and storage resources in the form of hypervisors and virtual machines (VMs). A VNF may be deployed in one or several VMs.

The NFV Management and Orchestration 130 covers the orchestration and lifecycle management of physical and/or software resources that support the infrastructure virtualization, and lifecycle management of VNFs. It may focus on all virtualization specific management tasks necessary in virtualized networks. From NFV's point of view, virtualized infrastructure management comprises the functionalities that are used to control and manage the interaction of a VNF with computing, storage and network resources under its authority, as well as their virtualization. The virtualized infrastructure orchestration comprises the orchestration and management of NFV infrastructure and software resources, and realizing network services on NFVI.

The NFV reference architectural framework is further described in detail in ETSI GS NFV 002 V1.1.1, entitled "Network Functions Virtualisation (NFV); Architectural Framework", October 2003, which is incorporated herein by reference in its entirety. It is to be noted that, the present invention is not restricted to the above NFV reference architectural framework, and can be implemented in any NFV architectural framework.

Figure 2:
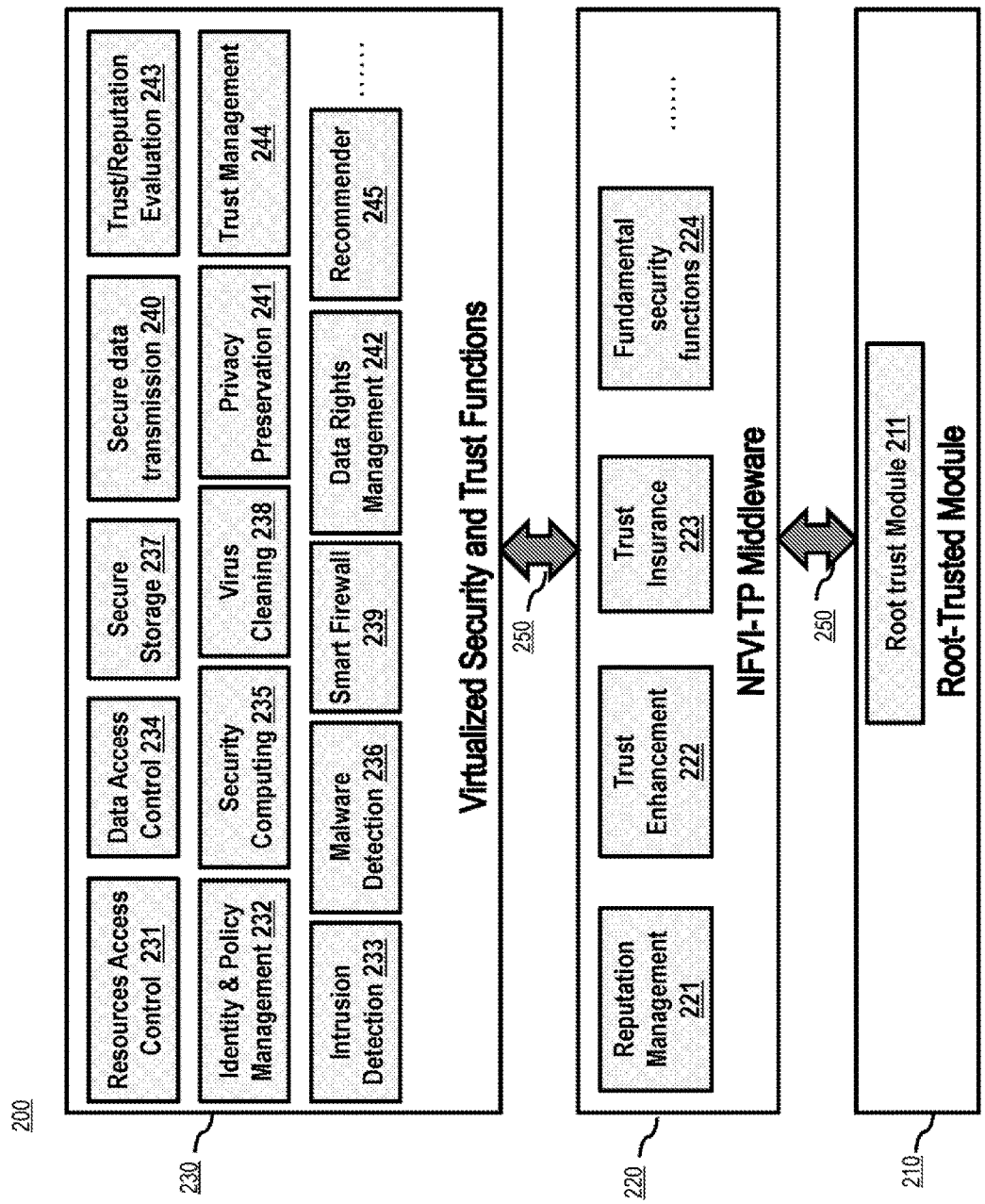
FIG. 2 illustrates a functional block diagram of an exemplary security and trust framework for virtualized networks according to an embodiment.

FIG. 2 illustrates a functional block diagram of an exemplary security and trust framework for virtualized networks according to an embodiment. As shown in FIG. 2, a NFVI Trust Platform (NFVI-TP) 200 comprises layers for Root-Trusted Module (RTM) 210, NFVI Trust Platform (NFVI-TP) Middleware 220, and Virtualized Security and Trust Functions (VSTF) 230.

The RTM layer 210 is the basis of the trust platform, and it includes a root trust module (RTM) 211 for providing root trust. Verification/monitoring 250 is done between layers so as to set up a trust chain among the layers, based on the root trust of RTM 211. For example, the verification could be based on the certificates or hash codes of components in respective layers. Monitoring is conducted about the performance/behaviors of components in respective layers and any changes/update of them in order to figure out security threats. In other words, RTM 211 is the basis of the trust chain. The trust and security of each layer may be ensured by establishing trust between every component built upon the NFVI-TP Middleware layer 220 and the VSTF layer 230 and the RTM layer, and verifying and maintaining the trust based on the root trust module (RTM) 211. For example, the trust and security may be ensured by verifying newly installed components (i.e. functional modules) in the NFV infrastructure is from a trustworthy party or as expected by the RTM.

The RTM 211 could be an independent module embedded in the trusted platform. In an embodiment, the RTM 211 could be embodied as a Trusted Platform Module (TPM) of Trusted Computing Platform with related software. Typical trusted computing technologies for the TPM are specified in the specifications of TCG (Trusted Computing Group). The TPM, i.e. an instance of RTM 211 at the trusted platform, may be a hardware-based security module, such as a chip. It may be designed to resist all software attacks and moderate hardware attacks. It encloses a non-volatile storage, a set of platform configuration registers (PCRs) and an engine for cryptographic operations. The TCG specifications define a suit of mechanisms including memory curtaining, secure I/O, secure storage, platform measurement and remote attestation. All are based on the TPM chip and its supporting software called TCG Software Stack (TSS). As a fundamental secure computing module, it plays as the root trust module to establish security and trust in digital computing, communications and networking. Basically, it can provide secure booting and software installation, private data protection and digital rights management (DRM), as well as remote attestation based communications and collaboration.

Thus, the RTM layer 210 is able to support a middleware layer 220 in a trustworthy way. The middleware layer 220 includes security and trust management components, which are designed to realize, maintain and ensure the trustworthiness of diversity of virtualized security and trust functions in the layer 230. In an embodiment, security and trust management components in the middleware layer 220 comprises a reputation management component 221, a trust enhancement component 222, a trust insurance component 223, and a fundamental security function component 224.

The reputation management component 221 is configured to monitor and evaluate the performance of virtualized network functions (VNFs) in a NFV infrastructure, in order to select a trustworthy VNF to install and execute in a specific context. The trust enhancement component 222 is configured to ensure QoS of one VNF or a number of VNFs, e.g., by applying a suitable resource arrangement strategy or adopting the best control modes in the NFVI. The trust insurance component 223 is configured to ensure a VNF to work as the expectation of an authorized party (e.g., a remote home operator), and to ensure a number of VNFs to collaborate with each other based on a specified policy or rule (e.g., according to a VNF Forwarding Graph or the criteria/policies/rules of a third party). The fundamental security function component 224 is configured to offer traditional or standard security functions, such as key generation, secure storage, secure authentication, cryptographic computation and verification etc. so as to ensure confidentiality, integrity, availability of information, authentication and non-repudiation, which are legacy security functions that should be provided in order to make the proposed framework compatible with old systems and can work in parallel with the legacy network devices. It will be appreciated that, additional components may be embedded into the NFVI-TP Middleware layer 220, in order to provide new functions or support new demands of security or trust management.

In the VSTF layer 230, one or more virtualized function blocks are deployed to provide particular functions related to security and trust. In this regard, the functions related to security and trust can be configured to guarantee that a networking device can be protected, or can perform in a secure way, or can securely collaborate with other network devices. These virtualized function blocks are generally deployed in a network function layer of virtualized networks as security and trust related VNFs, which can be commonly called by and cooperated with other VNFs.

In some embodiments, the virtualized function blocks may be divided into two kinds, comprising function blocks for security related functions (called SFs), and function blocks for trust related functions (called TFs). For example, the SFs may comprises one or more of the following virtualized network functions, including blocks of resource access control functions 231, identity management functions, policy management functions (or identity and policy management functions 232), intrusion detection functions 233, data access control functions 234, security related computing functions 235 (e.g., encryption/decryption, authentication etc.), malware detection functions 236, secure storage functions 237, virus cleaning functions 238, smart firewall functions 239, secure data transmission functions 240, privacy preservation functions 241, data rights management functions 242, and the like. The TFs may comprises one or more of the following VNFs, including blocks of trust evaluation functions, reputation generation functions (or trust/reputation generation functions 243), trust management functions 244, recommender functions 245, and the like, for example. It is contemplated that, SFs and TFs deployed in the VSTF layer 230 may be changed as needed. In this regard, additional SFs and TFs may be deployed in the VSTF layer 230, and functions of the SFs and/or TFs may be combined or divided to one or more VNFs.

The NFVI-TP 200 may dynamically deploy any number of SFs and TFs as needed in networking. The SFs and TFs may be offered by different third party service providers, e.g. Cloud Service Providers, and be deployed by authenticating the service providers and based on analysis provided by the reputation management component 221. In an embodiment, the NFVI-TP 200 may apply verifications on reputations or certificates (or both of them) of the SFs and TFs, to select trustworthy SFs and TFs for deployment. SFs and TFs deployed in the NFVI-TP 200 can access basic security functionalities offered by the fundamental security functions component 224, following access control policies that can be further ensured by RTM 211. For example, the access rights for the basic security functionalities may be decided based on respective functionalities of SFs and TFs and their reputations. As such, it is very flexible to embed any required security and trust functions into networking devices that adopt the proposed security and trust framework, by applying RTM technology, NFV technology and cloud computing technology.

The NFVI-TP can be configured to ensure each networking device in virtualized networks to work and collaborate with each other in a trustworthy way. Further, a number of NFVI-TPs can be configured to collaborate together over the virtualized networks, and exchange trust/reputation information of VNFs in a secure way, so as to help the reputation management component 221 to select most suitable VNFs for deployment.

The NFVI-TP can be embedded into a standard NFV architecture by an authorized party, e.g., an NFVI vendor or a deployer/operator of the virtualized networks. Referring back to the standardized NFV reference architectural framework shown in FIG. 1, RTM layer 210 may be implemented as one of the hardware resources; NFVI-TP middleware layer 220 may be located at the virtualization layer or implemented as one of the virtualized infrastructure managers; and SFs and TFs may be flexibly deployed as VNFs. In an embodiment, the components in the NFVI-TP middleware 220 may be also deployed as VNFs, which may access other VNFs including the SFs and TFs for security and trust management.

The security and trust framework supports two kinds of services related to security and trust: one kind is NFVI Trust Platform (NFVI-TP) as a Service, and the other kind is Security Functions as a Service and Trust Functions as a Service. For NFVI-TP as a Service, the trusted computing platform, solution stacks and related software packages of the NFVI-TP can be delivered as a service from the cloud. In an embodiment, the trusted computing platform, solution stacks and related software packages can be used by a consumer to create an application or service. For example, an operator of a virtualized network can download the platform from a cloud service provider, and install the platform in a networking device that acts as a router by deploying VNFs for implementing routing functions (e.g. software of routing applications), and create a trusted computing platform for routing applications. The deployment of function modules and configuration settings of the platform can also be controlled by the operator to host the routing applications. For SF as a Service and TF as a Service, related security functions and trusted functions of the SFs and TFs are delivered as a service from the cloud without requiring on-premises hardware.

The proposed security and trust framework is generic and can be deployed in any networking devices, such as servers, routers, switches and base stations that are compatible with NFVI. It provides a generic security and trust infrastructure for networking devices, so as to offer a uniform platform to embed any fundamental security functions, new advanced security functions and support cooperation among networking devices in a secure and trustworthy way in various networking contexts.

The proposed security and trust framework can achieve security in three folds. Firstly, the platform layer security is ensured by the RTM based on root trust. Additional trust can be induced on any components established upon the root trust, e.g., the NFVI-TF middleware components, SFs, TFs and VNFs. Secondly, VNFs' security can be achieved, by using certification verification or hash code verification that is handled by RTM, to ensure VNFs are sourced from a secure party and as expectation. Thirdly, attacks and intrusions, as well as any security threats on networking devices can be overcome, by deploying various SFs and TFs as VNFs.

The proposed security and trust framework can further achieve trust in three folds. Firstly, it is assumed that the fundamental trust can be offered by RTM 211, which depends on sound hardware security and advanced cryptographic technologies to achieve a basic trust relationship. Secondly, trust of each VNF and a number of composed VNFs will be maintained based on adaptive trust management and control mechanisms at runtime, by monitoring quality attributes and controlling VNFs' trust by adopting suitable trust management and control modes. Thirdly, by applying trust evaluation and reputation generation, network devices based on the proposed security and trust framework can select the most trustworthy VNFs for deployment and cooperate with trustworthy VNFs located in a remote device.

In the following, a number of key technologies and solution stacks supported in the security and trust framework for achieving security and trust of virtualized networks are introduced.

(1) Remote Attestation and Trust Sustainment

According to an embodiment of the present invention, NFVI-TP 200 is configured to apply a mechanism of remote attestation and trust sustainment, to ensure that one VNF can work at a networking device, as the expectation of an authorized party (e.g., a remote home operator). For example, in a scenario, a home operator may depend on a foreign operator to perform particular network functions according to its expectation in a trustworthy way, e.g. for counting traffic volume directly at the foreign network without the involvement of the host's home network during roaming. This mechanism can enable to achieve a better network performance and release the load of network management.

The trust insurance component 223 in NFVI-TP 200 can be utilized to apply the mechanism of remote attestation and trust sustainment, so that the particular network functions can be executed in a trustworthy way at a networking device of the foreign operator as the expectation of an authorized party, for example according to the agreement between the home operator and the foreign operator. The expectation may be defined as execution policies/criteria/rules of network functions, which are defined by the home operator or a third authorized party. The network functions are virtualized as VNFs and deployed in the networking device. RTM is used to ensure the fulfillment of execution policies/criteria/rules of a VNF running at a networking device.

In an embodiment, a protocol for trust sustainability among trusted computing platforms can be utilized to implement the mechanism of remote attestation and trust sustainment by the NFVI-TP 200. For example, an exemplary protocol is described in the inventor's paper entitled "A mechanism for trust sustainability among trusted computing platforms", (Z. Yan, P. Cofta, the First International Conference on Trust and Privacy in Digital Business (TrustBus'04), LNCS 3184, pp. 11-19, Spain, September 2004). It will be appreciated that, other protocols or approaches for remote attestation and trust sustainment among trusted computing platforms, now known or later developed, may also be used to implement this mechanism.

Figure 3:
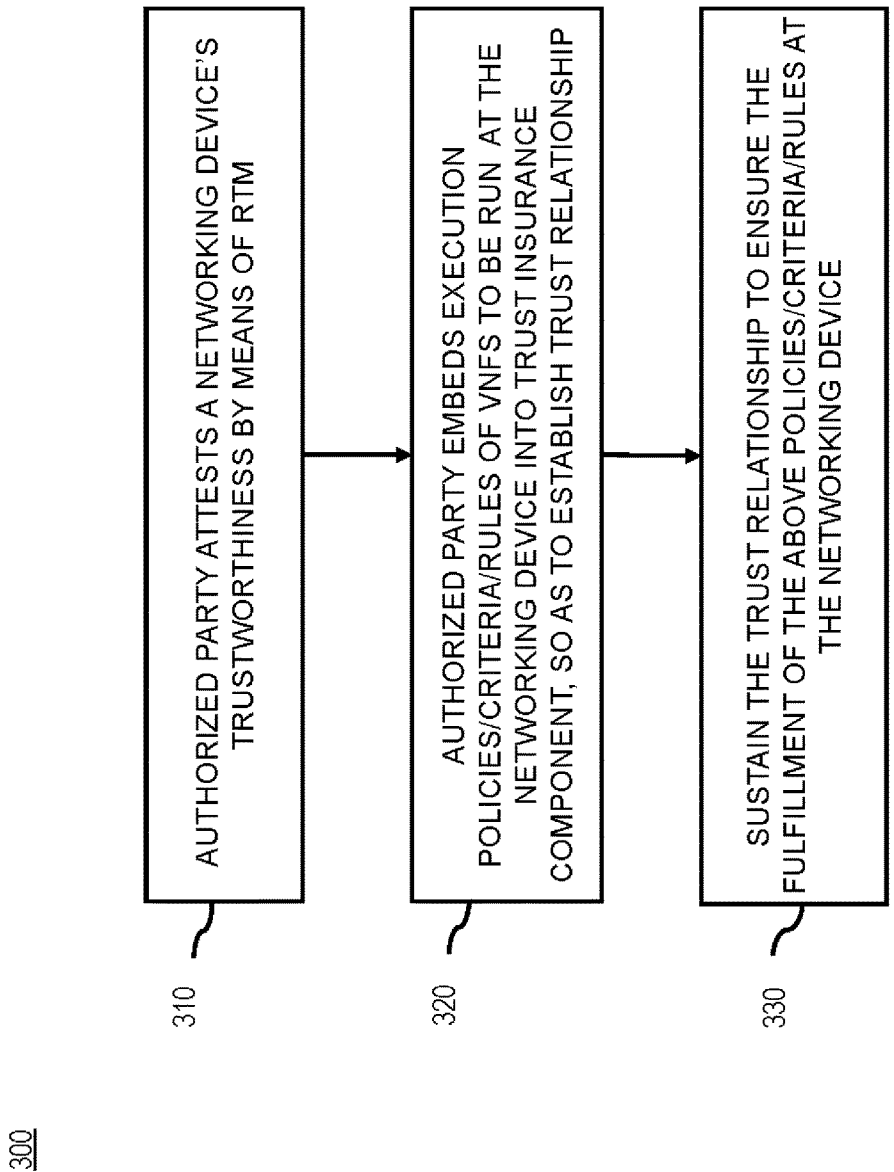
FIG. 3 illustrates a flow diagram of a method for remote attestation and trust sustainment in accordance with an embodiment of the present invention.

FIG. 3 illustrates a flow diagram of a method for sustaining a home operator's trust on a networking device at a remote operator based on NFVI-TP, also referred to herein as remote attestation and trust sustainment, in accordance with an embodiment of the present invention. The NFVI-TP can be deployed at a networking device or a server of a foreign operator according to the expectation specified by an authorized party (e.g., a home operator). At step 310, an authorized party attests the networking device's trustworthiness. In an example, a remote server of the home operator acts as the authorized party for verifying that the RTM and the computing platform of the networking device is as expected. For example, the remote server may send a root trust challenge to RTM of a networking device, and in response, receive an evidence of root trust from the networking device. Through a verification of the received evidence, the networking device can be attested to ensure the networking device's basic trust depended by the remote server. If the verification is not successful, it is determined that the networking device is not trustworthy, and then the trust relationship between the remote server (e.g., in a home operator) and the networking device cannot be established.

At step 320, the authorized party embeds execution policies/criteria/rules of VNFs to be run at the networking device into the trust insurance component of the NFVI-TP of the networking device. In this example, a trust relationship between the remote server of the home operator and the networking device can be established, by specifying the execution policies/criteria/rules and embedding them at the trust insurance component of NFVI-TP of the networking device, which can ensure the trust relationship according to the specified policies/criteria/rules.

At step 330, the trust relationship is sustained through the NFVI-TP, to ensure the fulfillment of the above policies/criteria/rules at the networking device. The RTM of the networking device can ensure that the networking device can behave according to the embedded policies/criteria/rules, and in turn according to the expectation of the remote server (i.e. the willingness of the home operator). In this regard, the execution policies/criteria/rules are further verified and then registered as trust conditions at the RTM of the networking device for trust sustaining. For example, the RTM of the networking device can monitor changes against trust conditions which are associated with the execution policies/criteria/rules. The RTM of the networking device can also enforce other components in the computing platform to report any change to it for checking the permission of changes with the registered policies/criteria/rules. If there is no change, or the monitored or reported changes are permitted, the function execution on the networking device is allowed to be continued, and the RTM continues the monitoring. If the changes are not permitted, the RTM can notify the changes to the trust insurance component 223, and in turn notify the authorized party (e.g. the remote server at the home operator) to take corresponding actions. For example, the home operator can re-challenge the trust relationship, or decide to stop transaction and cooperation between the home operator and the networking device.

(2) Trust Management and QoS Enhancement of VNFs

Figure 4:
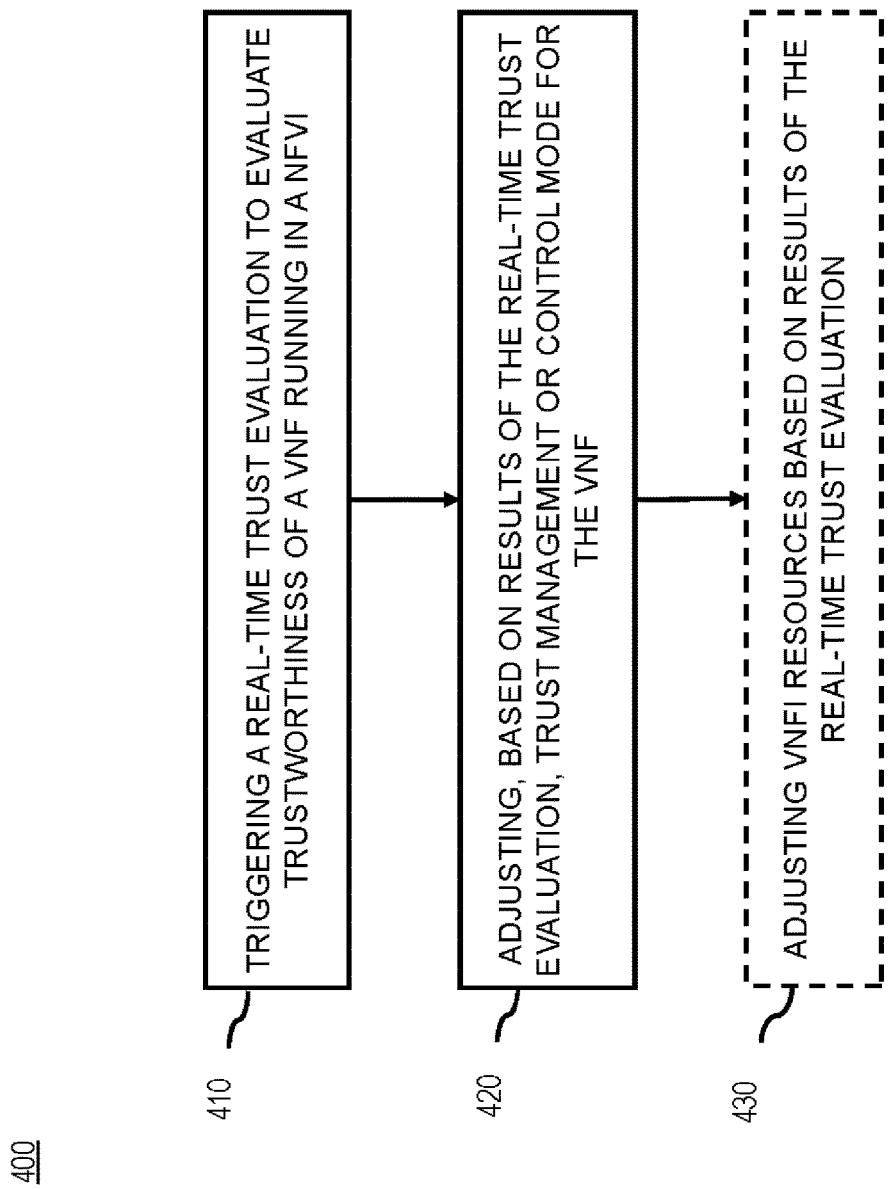
FIG. 4 illustrates a flow diagram of a method for ensuring QoS of VNFs at runtime by applying an adaptive trust control model, in accordance with an embodiment of the present invention.

According to an embodiment of the present invention, the NFVI-TP 200 is utilized to ensure the QoS of VNFs that run upon it. Based on capabilities and competences of the NFVI-TP 200, a performance with regard to quality attributes of each VNF can be monitored, and adaptive mechanisms can be applied accordingly, in order to ensure the trustworthiness of VNFs at runtime. FIG. 4 illustrates a flow diagram of a method for ensuring QoS of VNFs at runtime by applying an adaptive trust control model, in accordance with an embodiment of the present invention. This process can be implemented by the trust enhancement component of the NFVI-TP.

At step 410, a real-time trust evaluation is triggered to evaluate the trustworthiness of a VNF running in a NFVI. The trustworthiness is influenced by a number of quality-attributes specified for reflecting QoS of the VNF. Thus, the evaluation of trustworthiness is conducted by monitoring the VNF's performance with regard to specified quality attributes, for example at runtime of the VNF and then evaluating trust of the VNFs based on the monitored performance.

At step 420, based on results of the real-time trust evaluation, a trust management or control mode for the VNF is adjusted to enhance the QoS and trustworthiness of the VNF. The trust control mode can be treated as a special configuration of trust management that can be provided by the NFVI or the NVFI-TP. In addition, VNFI resources may be also dynamically adjusted or arranged based on the results of the real-time trust evaluation, at step 430. For example, if the evaluated trust value is below an expected threshold, the NFVI-TP can select a most suitable trust control mode, to enhance the performance with regard to QoS of the VNF.

In an embodiment, an exemplary adaptive trust control model can be applied based on the theory of fuzzy cognitive map, as introduced in the inventor's paper entitled "Autonomic Trust Management for a Component Based Software System" (Z. Yan, C. Prehofer, IEEE Transactions on Dependable and Secure Computing, Vol. 8, No. 6, pp. 810-823, 2011). It will be appreciated that, other approaches for implementing the adaptive trust control model, now known or later developed, may also be used.

(3) Reputation-Ensured Deployment of SFs and TFs

Figure 5:
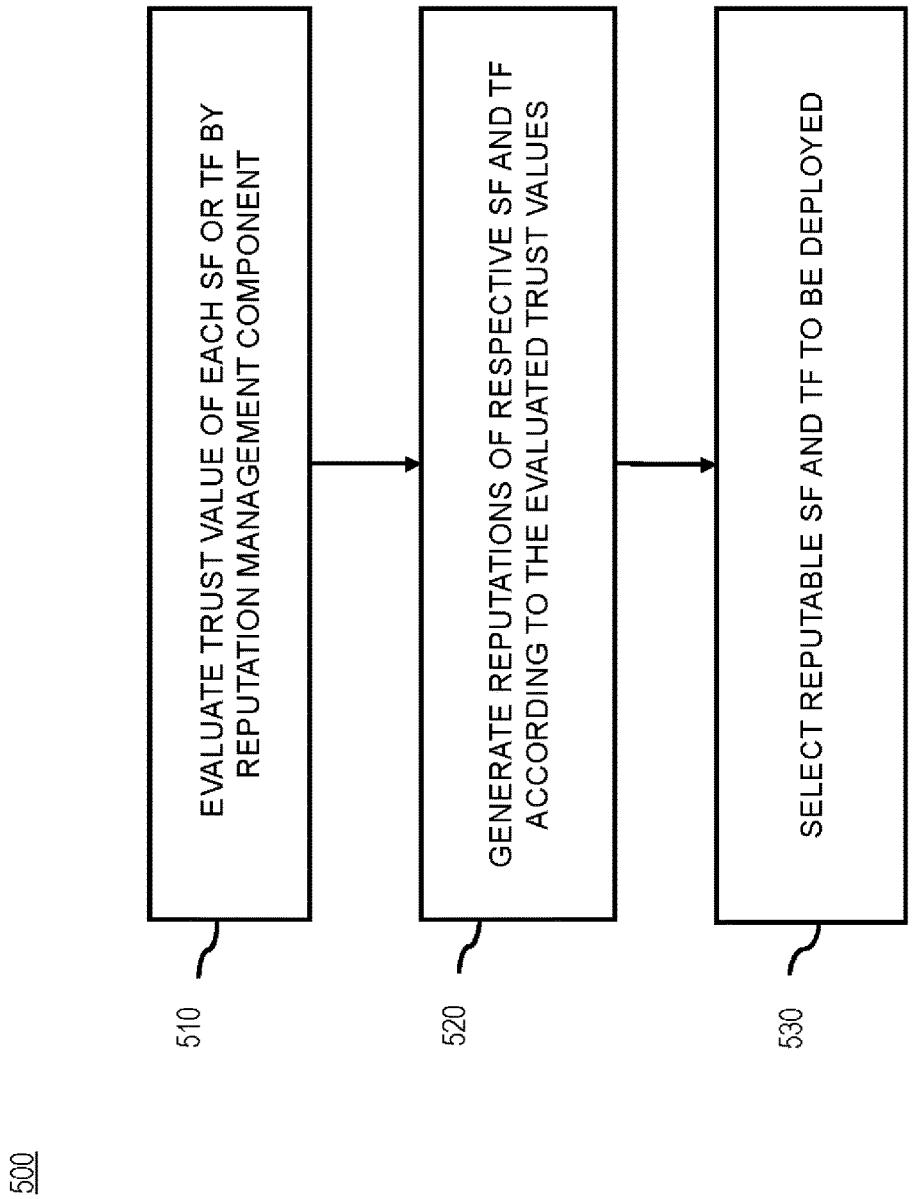
FIG. 5 illustrates a flow diagram of a method for deploying trustworthy SFs and TFs based on reputations, also referred to herein as reputation-ensured deployment, in accordance with an embodiment of the present invention.

According to an embodiment of the present invention, the performance of SFs and TFs are monitored and evaluated by the reputation management component of NFVI-TP, so as to support a reputation-ensured deployment of SFs and TFs. The SFs and TFs may be provided by different vendors. Thus, multi-vendor provided SFs and TFs can be executed in the same networking device. FIG. 5 illustrates a flow diagram of a method for deploying trustworthy SFs and TFs based on reputations, also referred to herein as reputation-ensured deployment, in accordance with an embodiment of the present invention.

At step 510, a trust value of each SF or TF is evaluated by the reputation management component of NFVI-TP. The trust value can be evaluated at each networking device over the networks, e.g., based on the execution quality and performance of SF or TF evaluated at runtime as described above, as well as feedback/recommendations collected from other networking devices. At step 520, reputations of respective SFs and TFs are generated according to the evaluated trust values. The evaluated trust values of each SF and TF can be accumulated in either a centralized way or a distributed way for the reputations generation. A suitable reputation generation mechanism can be applied herein. It will be appreciated that, other approaches for reputation generation, now known or later developed, may also be used, e.g., context-aware reputation generation. Next at step 530, most reputable SFs and TFs can be selected to be deployed in the VSTF layer 230 of NFVI-TP, based on the generated reputations.

As such, trustworthiness of the deployment of SF and TF can be enhanced. It is appreciated that, various mechanisms and algorithms can be adopted for realizing the trust evaluation at step 510 and the reputation generation at step 520. For example, in some embodiments, the reputations generation can be conducted in terms of real application contexts of the related SFs and TFs. These mechanisms and algorithms can be flexibly embedded into the NFVI-TP using the technology of NFV and based on RTM, concretely by the reputation management component 221, for example with context-awareness support.

(4) Execution of VNF Forwarding Graph and Policies of a Third Party

In virtualized networks, a very crucial issue is how to ensure that VNFs can cooperate with each other based on VNF Forwarding Graph, and rules/criteria/policies defined by a third party (e.g., an operator of a virtualized network). VNF Forwarding Graph focuses on relations that express connectivity between network functions and aspects related to the connectivity. In an embodiment, the proposed security and trust framework is configured to ensure execution of VNF Forwarding Graph and policies of a third party, through the trust insurance component 223 of NFVI-TP 200.

Figure 6:
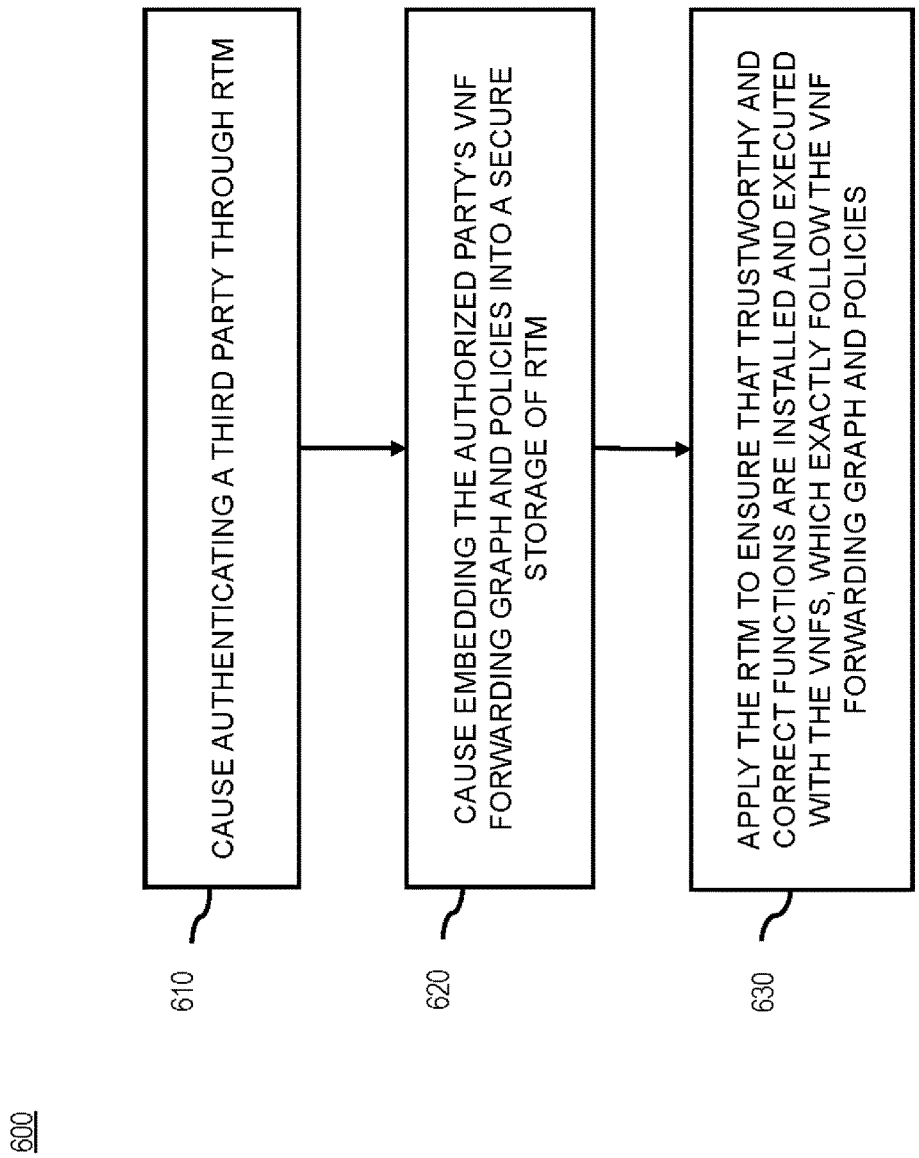
FIG. 6 illustrates a flow diagram of a method for ensuring a set of VNFs' execution of VNF Forwarding Graph and policies of a third party, in accordance with an embodiment of the present invention.

FIG. 6 illustrates a flow diagram of a method for ensuring a set of VNFs' execution of VNF Forwarding Graph and policies of a third party, in accordance with an embodiment of the present invention. At step 610, the trust insurance component of NFVI-TP is configured to cause an authentication on a third party, for example, based on the root trust. Generally, only VNF Forwarding Graph and policies defined by an authorized third party will be allowed to be embedded into the NFVI-TP 200. At step 620, the trust insurance component is configured to cause embedding the authorized party's VNF Forwarding Graph and policies into the NFVI-TP with the support of RTM. In an embodiment, the trust insurance component 223 can negotiate with related parties (e.g. networking devices on which the VNFs run), to achieve an agreement on the VNF Forwarding Graph and policies/criteria/rules. At step 630, the trust insurance component 223 is configured to control an execution flow, by applying the RTM to ensure that trustworthy and correct functions are installed and executed with the VNFs, which exactly follows the embedded policies/rules/criteria and the VNF Forwarding Graph. For example, the execution of policies/rules/criteria and the VNF Forwarding Graph can be ensured in a similar way as that for the above-discussed trust sustainment. Expected software or software components certified by a trustworthy party can be installed and executed at the networking devices to fulfill the requirements and specifications described by the policies/rules/criteria and the VNF Forwarding Graph.

It is appreciated that, in the present embodiment, the policies/rules/criteria and VNF forwarding graphs can be dynamically embedded into the trust insurance component 223 and seek support from local RTM. Additional secure authentications and trust verifications on an authorized party for such an embedment could be performed for this process.

(5) VNF Reputation Generation

In an embodiment, the NFVI-TP 200 is configured to generate reputations for VNFs in virtualized networks. For example, reputations can be generated based on local performance monitoring and trust evaluation on each running VNF. Additionally or alternatively, reputations can be generated based on trust information collected from other network devices.

Similar as the reputation-ensured deployment of SFs and TFs, various mechanisms and algorithms can be adopted for realizing the trust evaluation and reputation generation of VNF. Also similar as the reputation-ensured deployment of SFs and TFs, the generated VNF reputations can be utilized for deploying VNFs. For example, according to aggregated reputations for one or more VNFs, requests can be triggered to a cloud service provider to deploy a concrete VNF at a local NFVI. In another example, according to the generated reputations, recommendations can be initiated (e.g. by SF 245) to other networking devices with the same purpose, i.e. recommending the other networking device to deploy a concrete VNF.

(6) Identity Management

In an embodiment, a VNF is identified using its hash code in the proposed security and trust framework. The identifier of a VNF can be used for reputation/trust generation, and for indicating a VNF in a VNF forwarding graph. Identifiers of all installed VNFs in an NFVI can be registered at a secure storage of the RTM layer 210. Then, an identifier of a VNF can be certified by the RTM of a networking device hosting the VNF, for example for communication purposes.

(7) Secure Authentication

In an embodiment, the authentication of a VNF can be achieved by authenticating reputation level of the VNF. The reputation level of the VNF can be issued by each NFVI-TP deployed in networking devices that install the VNF, and signed by the NFVI-TP's RTM.

In some embodiments, the proposed security and trust framework is configured to support SDN security protection. In this regard, the control plane and data plane of SDN can be implemented based on the referral architecture of NFV, such as the NFVI as shown in FIG. 1. For example, functions for the control plane are virtualized as VNFs, which can be installed at devices implementing the control plane (also referred to as control plane devices). Similarly, functions for the data plane are also virtualized as VNFs, which can be installed at devices implementing the data plane (also referred to as data plane devices). These control plane devices and data plane devices are further built up based on the proposed security and trust framework, such as the NFVI-TP 200.

Generally, SDN security concerns two important issues: one is secure authentications between the control plane and the data plane; the other is protections on the control plane and the data plane against security threats. Now, we will illustrate how to protect SDN security with the proposed security and trust framework.

The control plane and data plane can authenticate with each other based on the identifiers of VNFs of the control plane and VNFs of the data plane, and their reputations. Their identifiers are certified by the RTM 211. An identity management VNF (such as 232) can be configured to process authentications at the control plane and the data plane, respectively.

Both the control plane and the data plane can be protected from various security threats, by installing SFs and TFs on the basis of NFVI-TF. For example, malicious unwanted traffic intrusions can be detected by SF 233, malware intrusions can be detected by SF 236, a smart firewall (such as SF 239) can block attacks from detected malicious sources, and a virus cleaner (such as SF 238) can kill and clean virus efficiently if there is any. In addition, various TFs can be installed to assist the planes to collect useful information for performing trust evaluation on a third network entity, generate reputation by exchanging experiences with other entities, and select trustworthy entities for cooperation. As such, security threats for the control plane and data plane can be effectively removed by integrating both trust functions and security functions.

In an embodiment, a kind of intrusion detection SF (such as SF 233) against malicious traffic controls can be certified and installed at the data plane devices, to fight against malicious control instructions from a control plane at the data plane. One example implementation of this SF is applying pattern recognition or data mining mechanisms to find abnormal control instructions according to the analysis and mining on the control instructions for figuring out normal instruction patterns and pick up abnormal or malicious ones, so as to take corresponding actions effectively.

As such, the invented security and trust framework provides a holistic security and trust solution for virtualized networks. First, NFVI security can be ensured at a networking device. Applying RTM can ensure the components and VNFs installed at the device is trustworthy as expectation. Second, the RTM, NFVI-TP, SFs and TFs can help the networking device to perform securely in the cooperation and communication with other devices in order to fulfill networking tasks. Third, SFs & TFs work together to help the networking device overcome any intrusions and attacks, as well as avoid security threats. Forth, the RTM and NFVI-TP ensure the QoS and running trust of the SFs, TFs and VNFs installed and executed at the NFVI. Fifth, the invented framework can ensure a VNF running at a device can perform according to the policies/rules/criteria agreed between the local device and a remote device. It can also ensure VNFs cooperate following their forwarding graph.

Now, description is made about how the proposed security and trust framework is able to fulfill the security requirements for the NFV framework from nine aspects. In the first aspect, the NFVI-TP can provide appropriate security countermeasures for the NFV framework in the following points:

In order to cure or alleviate security vulnerabilities introduced by the virtualization layer, the RTM can be applied, to ensure any components installed and executed at the virtualization layer of NFV framework is trustworthy.

In order to protect data stored on shared storage resources or transmitted via shared network resources in virtualized networks, SFs about security computing and secure data communications can be deployed to support secure data transmission via the shared network resources.

In order to protect new interfaces exposed by the interconnectivity among NFV end-to-end architectural components, e.g., hardware resources, VNFs, and management systems, the NFVI-TP can be configured to support trustworthy interconnectivity and cooperation among NFV architectural components. In this regard, the execution trust of VNFs can be ensured by adaptively adopting suitable trust management and control modes at NFVI, by the technology of trust management and QoS enhancement as discussed above. Execution policies can be ensured using remote attestation, trust sustainment and RTM technologies, as discussed above.

The trust insurance component 223 in NFVI-TP can be configured to achieve an isolation of distinct VNF sets executing over the NFVI to ensure security and separation between these VNF sets. In this regard, policies of the VNF isolation can be registered as execution policies by the trust insurance component, and then it can make sure that the execution isolation is ensured by ensuring the fulfillment of the execution policies of related VNFs. The trust insurance component can further controls communications and callings happened inside the indicated sets of the executed VNFs based on its embedded policies/rules/criteria related to these actions if any. If isolation cannot be ensured and found by RTM, a warning will be raised by the NFVI-TP. For example, this can be implemented with the technology for execution of VNF Forwarding Graph and policies of a third party, as discussed above. Trusted execution environment can be thus implemented by making the policies to ensure limited resource control required by execution isolation.

In order to support a secure management of VNF sets by other third-party entities (e.g. VNPaaS (Virtual Network Platform as a Service), enterprise virtual CPE (Customer Premises Equipment), and virtual consumer home gateways), the technology of remote attestation and trust sustainment as discussed above can be applied, to ensure one or a set of VNFs to execute based on the policies/rules/criteria specified by a third authorized party.

In the second aspect, the proposed security and trust framework can further enable the NFV framework to provide mechanisms for a network operator to control and verify the configuration of the elements that virtualize the hardware resource. As a part of the NFV framework, NFVI-TP can be configured by the network operator (that deploys it) at different networking devices, in order to satisfy the demand on hardware resource virtualization. Hardware resource allocation can be handled by NFVI-TP by applying the technology of trust management and QoS enhancement as discussed above. In this regard, the trust management and control mode is a configuration of hardware resource and security/trust enhancement mechanisms, which can be adopted at the NFV framework at the runtime of VNFs. NFVI-TP's trust enhancement component is applied to realize this function for adaptively selecting a suitable trust management and control mode. The configuration of the elements that virtualize the hardware resource can be verified as expectation by using attestation based on RTM, which can be triggered by the network operator.

In the third aspect, the fundamental security functions 224 in NFVI-TP and SFs (such as 235) can be deployed, to enable management and orchestration functionalities to use standard security mechanisms wherever applicable for authentication, authorization, encryption and validation.

In the fourth aspect, through NFVI-TP, the NFV Infrastructure is able to use standard security mechanisms wherever applicable for authentication, authorization, encryption and validation. In this regard, the proposed security and trust framework can embed or deploy standard security mechanisms as either the fundamental security functions 224 in NFVI-TP or deploying SFs (such as 235) as VNFs. In particular, any standard security mechanisms can be deployed as SFs over NFVI by selecting the best candidates from a cloud service provider (e.g., a cloud security-service provider). Further, security of shared storage (e.g. mirroring, backups) can be realized by the trust enhancement component. In this regard. mirroring or backups are kinds of trust management or control mechanisms configured as a part of a control mode offered by the NFVI-TP.

In the fifth aspect, the proposed security and trust framework can further enable the NFV framework to provide role-based information access control and rights management. In this regard, data access control mechanisms based on either roles, identities, or attributes can be deployed as SFs in the NFVI-TP. Data rights management can also be deployed as a SF. For example, the SFs for identity and policy management (such as SF 232) can be deployed in the NFVI-TP, and cooperates with the trust insurance component 223 in NFVI-TP and (resource/data) access control SFs 231 and 234, to enable each actor, based on its associated role definition, have access to a subset of the VNF instances and a subset of the VNF instances management functions (e.g. creation, modification, activation . . . ). A special role may be the administrator role that is able to manage roles and rights.

In the sixth aspect, access to NFV functions via NFV exposed APIs at all layers can be protected by the trust relationship chain established among these layers. As discussed above, in the proposed security and trust network, the trust relationship chain can be established based on the RTM. In the RTM, NFVI-TP, SFs, standard security mechanisms appropriate for the corresponding layers can be provided and can be embedded based on practical demands, so that the access via exposed APIs can be protected by using standard security mechanisms appropriate for that layer, wherever applicable for authentication, authorization, data encryption, data confidentiality and data integrity.

In the seventh aspect, a SF for resource access control (such as SF 231) can be configured in the proposed security and trust framework, to enable the management and orchestration functionality in the NFV architecture to provide at least two levels of privileges to API clients (e.g. root privilege and user privilege, in this case the root privilege is a higher level of privilege than the user one). Each privilege gives access to a range of differentiated APIs.

In the eighth aspect, SFs for resource and data access control (such as 231 and 234) can be configured to support a division of NFV exposed APIs based on corresponding levels of privilege. In this regard, the NFV exposed APIs can be divided into multiple subsets of APIs, so that clients with different levels of privilege will only be able to use certain subsets of API functionality based on the clients' levels of privilege. A special case is that the management and orchestration functionality allow using all APIs for the highest privilege only.

In the ninth aspect, generally in the NFV architecture, the management and orchestration functionality is able to authorize client's privilege for using APIs based on operator-defined criteria. For fulfilling this requirement, the SF 231 for resource access control, the trust insurance component 223 in NFVI-TP and RTM 210 can cooperate together, to ensure that the privilege management for resource access should follow the policy or criteria defined by an authorized party.

In summary, according to the embodiments of the present invention, security and trust management can be provided by the RTM 210 and NFVI-TP middleware 220 as an essential part of NFVI (in both the hardware and the virtualization layer), which can be deployed as a platform as a service. Additionally or alternatively, various kinds of security and trust functions can be deployed as Security as a Service and/or Trust as a Service, which are provided by cloud service providers and deployed as VNFs in the layer of VNF.

Figure 7:
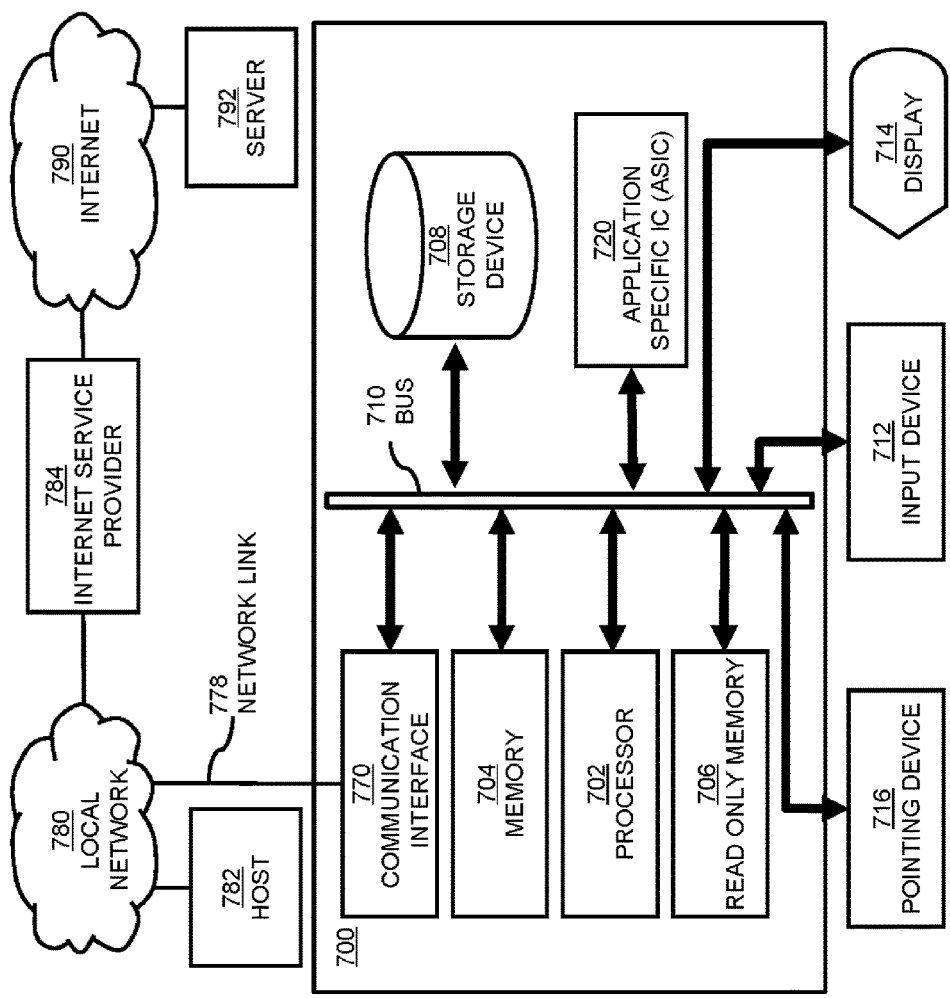
FIG. 7 illustrates a computer system 700 upon which an embodiment of the invention may be implemented.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.)

within FIG. 7 can deploy the illustrated hardware and components of system 700. Computer system 700 is compatible with NFVI, and is programmed (e.g., via computer program code or instructions) to deploy the security and trust framework and perform security and trust technologies and solutions as described herein, and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. Computer system 700, or a portion thereof, constitutes a means for performing one or more steps of security and trust technologies and solutions in virtualized networks.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to deploying the security and trust framework and performing security and trust technologies and solutions as described herein. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., a machine language). The set of operations include bringing information in from the bus 610 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for deploying the security and trust framework and performing security and trust technologies and solutions as described herein. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for deploying the security and trust framework and performing security and trust technologies and solutions as described herein, is provided to the bus 710 for use by the processor from an external input device 712, such as a keyboard containing alphanumeric keys operated by a human user, or a sensor. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communication interface 770 includes a radio band electromagnetic transmitter and receiver called a radio transceiver. In certain embodiments, the communication interface 770 enables connection to virtualized networks for deploying the security and trust framework and performing security and trust technologies and solutions as described herein.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides cloud services for security functions and trust functions. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to deploying the security and trust framework and performing security and trust technologies and solutions as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of performing multiple forms of communication in the same communication session.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to perform multiple forms of communication in the same communication session. The memory 805 also stores the data associated with or generated by the execution of the inventive steps.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. An apparatus for security and trust in a virtualized network, comprising:
   at least one processor; and
   at least one memory including computer program code,
   the at least one memory and the computer program code configured to, with the at least one processor, cause the apparatus to perform at least the following:
   deploy a root trust module for providing root trust; and
   deploy a middleware, for managing security and trust of virtualized network functions by verifying, establishing or maintaining trust with regard to the virtualized network functions based on the root trust,
   wherein the middleware is configured to
   embed policies for executions of the virtualized network functions into a secure storage;
   verify trust throughout executions of the virtualized network functions based on a fulfillment of the embedded policies; and
   ensure the embedded policies to be fulfilled.

2. An apparatus of claim 1, wherein the middleware is further configured to:
   monitor performance of the virtualized network functions;
   evaluate reputations of the virtualized network functions based on the performance and other collected related information; and
   select trustworthy virtualized network functions based on respective evaluated reputations.

3. An apparatus of claim 1, wherein the middleware is further configured to:
   monitor QoS-related performance of a virtualized network function;
   evaluate trust of the virtualized network function based on the monitored performance;
   adaptively select a resource arrangement strategy and control modes based on the evaluated trust.

4. An apparatus of claim 1, wherein the policies are defined by a third party, and the apparatus is further configured to cause an authentication for the third party before the policies is allowed to be embedded.

5. An apparatus of claim 1, wherein the policies comprise virtualized network function forwarding graphs.

6. An apparatus of claim 1, wherein the virtualized network functions are identified by using associated hash codes which are registered in the root trust module.

7. An apparatus of claim 1, wherein the middleware and the root trust module are deployed in the apparatus as a platform as a service.

8. An apparatus of claim 1, wherein the apparatus is further caused to: deploy virtualized network functions related to security and trust.

9. An apparatus of claim 8, wherein the virtualized network functions is deployed in the apparatus as a service.

10. A method for security and trust management in a virtualized network, comprising:
    deploying a root trust module for providing root trust; and
    deploying a middleware, for managing security and trust of virtualized network functions by verifying, establishing or maintaining trust with regard to the virtualized network functions based on the root trust; and
    managing security and trust of virtualized network functions by the middleware, and the managing comprises:
    embedding policies for executions of the virtualized network functions into a secure storage;
    verifying trust throughout executions of the virtualized network functions based on a fulfillment of the embedded policies; and
    ensuring the embedded policies to be fulfilled.

11. A method of claim 10, further comprising:
    managing security and trust of virtualized network functions by the middleware, wherein the managing comprises:
    monitoring performance of the virtualized network functions;
    evaluating reputations of the virtualized network functions based on the performance and other collected related information; and
    selecting trustworthy virtualized network functions based on respective evaluated reputations.

12. A method of claim 10, further comprising:
    managing security and trust of virtualized network functions by the middleware, and the managing comprises:
    monitoring QoS-related performance of a virtualized network function;
    evaluating trust of the virtualized network function based on the monitored performance;
    adaptively selecting a resource arrangement strategy and control modes based on the evaluated trust.

13. A method of claim 10, wherein the policies are defined by a third party, and the managing further comprises:
  causing an authentication for the third party before the policies is allowed to be embedded.

14. A method of claim 10, wherein the policies comprise virtualized network function forwarding graphs.

15. A method of claim 10, wherein the virtualized network functions are identified by using associated hash codes that are registered in the root trust module.

16. A method of claim 10, wherein the middleware and the root trust module are deployed as a platform as a service.

17. A method of claim 10, further comprising:
  deploying virtualized network functions related to security and trust.

18. A method of claim 17, wherein the virtualized network functions is deployed in the apparatus as a service.

* * * * *